United States Patent [19]

Muramatsu et al.

[11] Patent Number: 5,188,198
[45] Date of Patent: Feb. 23, 1993

[54] POWER SPRING DRIVE APPARATUS

[75] Inventors: Kenji Muramatsu; Hiroyuki Iwashita, both of Nagano, Japan

[73] Assignee: K.K. Sankyo Seiki Seisakusho, Nagano, Japan

[21] Appl. No.: 825,835

[22] Filed: Jan. 28, 1992

Related U.S. Application Data

[63] Continuation of Ser. No. 537,716, Jun. 14, 1990, abandoned.

[30] Foreign Application Priority Data

Jun. 16, 1989 [JP] Japan .................. 1-70447

[51] Int. Cl.⁵ .................. F03G 1/00; A63H 29/00
[52] U.S. Cl. .................. 185/39; 185/DIG. 1; 185/45; 446/464
[58] Field of Search .................. 185/39, 45, DIG. 1; 446/462, 463, 464

[56] References Cited

U.S. PATENT DOCUMENTS

| | | | |
|---|---|---|---|
| 1,952,713 | 3/1934 | Kelch | 185/45 |
| 3,559,766 | 2/1971 | Heslop | 185/39 |
| 4,463,831 | 8/1984 | Wakase | 446/464 X |
| 4,469,197 | 9/1984 | Minoru | 446/464 X |
| 4,478,313 | 10/1984 | Wakase | 185/DIG. 1 X |
| 4,496,330 | 1/1985 | Terui | 446/464 |
| 4,662,477 | 5/1987 | Minoru | 446/464 X |
| 4,710,147 | 12/1987 | Wakase | 446/464 |
| 4,842,567 | 6/1989 | Hiraide | 185/DIG. 1 X |

FOREIGN PATENT DOCUMENTS 2205563 9/1972 Fed. Rep. of Germany.

*Primary Examiner*—Allan D. Herrmann
*Assistant Examiner*—Julie Krolikowski
*Attorney, Agent, or Firm*—Sughrue, Mion, Zinn, Macpeak & Seas

[57] ABSTRACT

A power spring drive apparatus having a power spring on a power spring wind up shaft, an output shaft, and a gear train for winding the power spring and for transferring the rotational force of a wound power spring to the output shaft. The apparatus is in a housing case formed of first and second synthetic resin cases connected together by pins and receiving holes. The housing case has a power spring housing section with a window between the section and externally of the housing. One end of the power spring has a neck shape and extends through the window and is fastened to the housing.

3 Claims, 5 Drawing Sheets

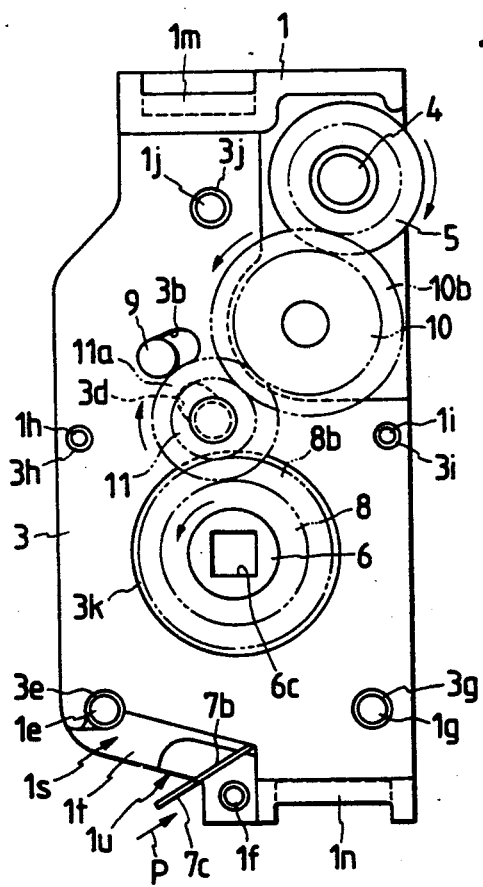
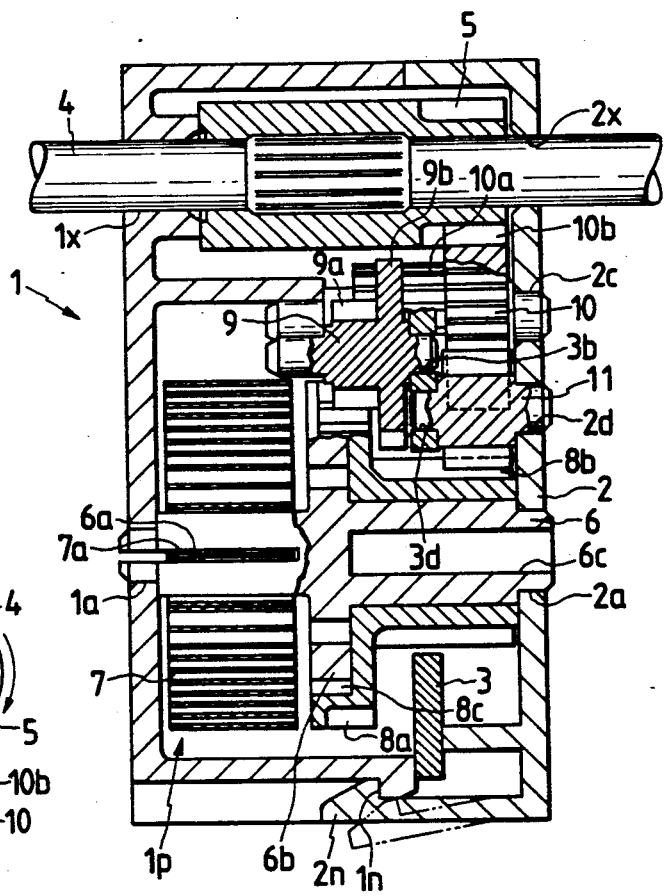
FIG. 1
FIG. 2

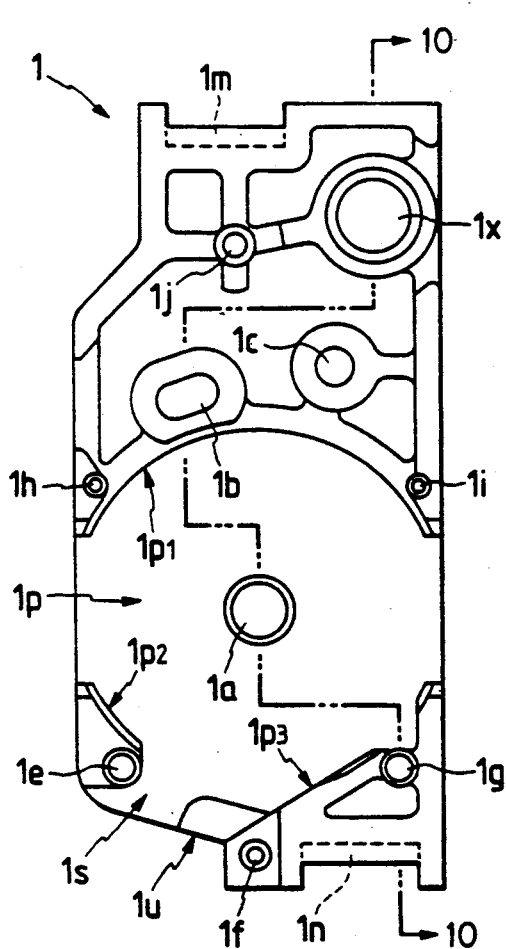
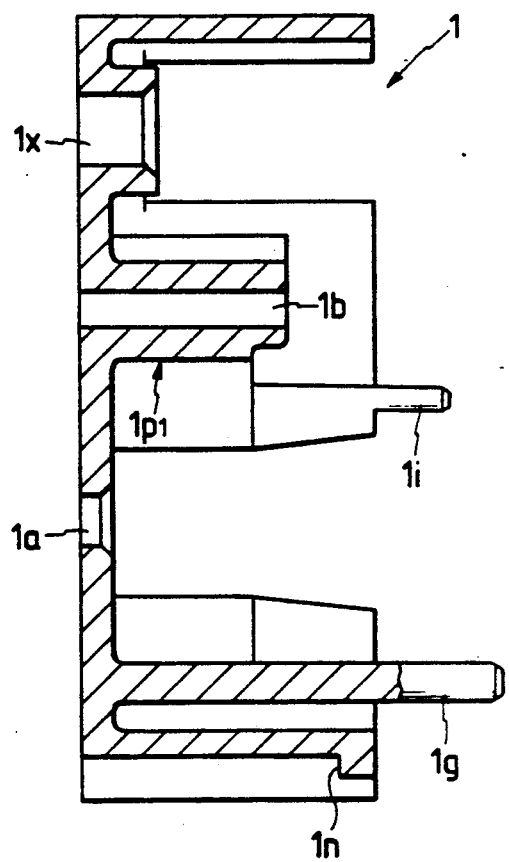

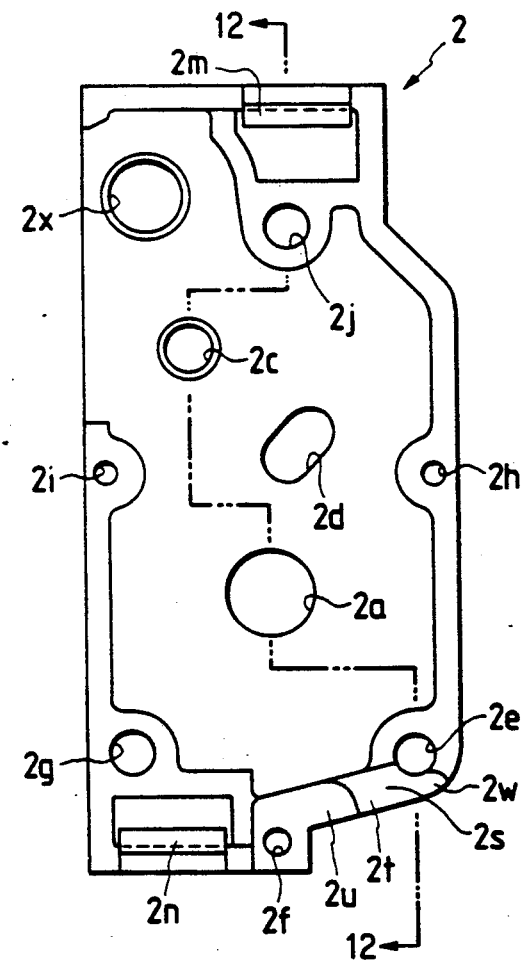
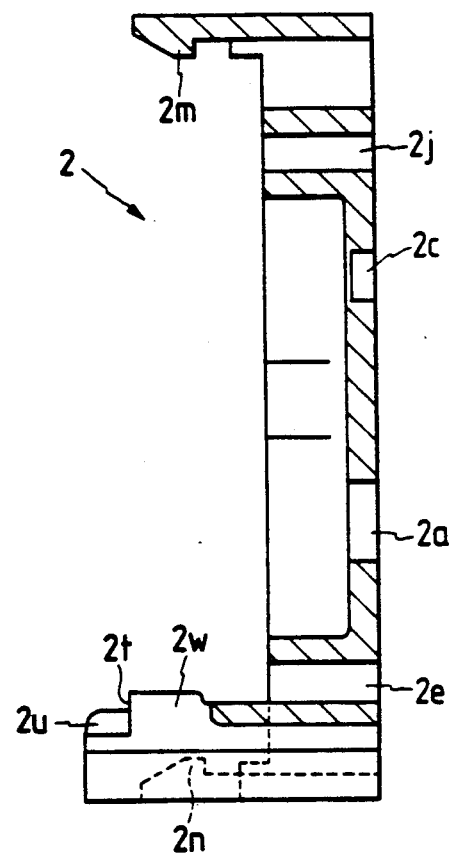

POWER SPRING DRIVE APPARATUS

This is a continuation of application Ser. No. 07/537,716 filed Jun. 14, 1990, now abandoned.

BACKGROUND OF THE INVENTION

The present invention relates to a power spring drive apparatus preferably used for a toy and the like.

In a power spring of a power spring drive apparatus of the type which uses the releasing force of the wound power spring, the inner end is fastened to a wind up shaft of the power spring, and the outer end is fastened to a fastening member. Power spring driving apparatus can be categorized according to the connecting method of the outer end to the fastening member, in the following categories:

Example 1—A small type power spring motor wherein the outer end is bent in a U shape and it is fastened to a fastening member such as a pin;

Example 2—A pull back motor wherein a concave section facing the peripheral wall of the power spring housing section and a protruded section disposed at the outer end of the power spring is fastened with the concave section; the second example is mounted in a toy known by the trade name "CHORO Q";

Example 3—A KAORI box which is known as a drive source for a music box, wherein a lug section formed at the outer end fastened with a metal frame.

Regardless of the fastening method is used, to effectively use the torque of the power spring which is wound up by turning the power spring wind up shaft, it is necessary to fasten the outer end of the power spring.

In each of the first and second examples described above, the outer end of the power spring is bent, thereby raising the production cost of the entire power spring. In the first example, when winding the power spring about the power spring wind up shaft so that it is housed in the power spring housing section, unless the outer end is properly fastened to the fastening pin, since the outer end is caught in the housing section, the outer end cannot be secured.

In the second example, since the fastening section at the outer end is formed on the periphery of the power spring housing section, the size of the power spring housing box becomes large. In the third example, since the frame is made of metal, it is impossible to accomplish an accurate casing structure. In this example, to support the gear train, complicated shaped parts should be used and thereby the production cost rises.

In addition, to reduce the weight and the number of parts of the apparatus and lower the production cost, a casing made of synthetic resin is advantageous. However, for the apparatus to obtain a large driving force from the power spring, the casing tends to get damaged and deformed.

SUMMARY OF THE INVENTION

An object of the present invention is to solve such problems, namely, to provide an apparatus wherein the production cost of that power spring is low and the a casing made of synthetic resin is provided and does not deform.

The power spring drive apparatus according to the present invention comprises a synthetic resin casing having a first case and a second case, each of which is fastened to one another, a power spring located in a power spring housing section disposed in the casing, wind up system one-way tension transfer means for transferring a rotating force of said output shaft, and releasing system one-way tension transfer means for transferring a rotating force of said power spring wind up shaft to said output shaft, said wind up system one-way tension transfer means and said releasing system one-way tension transfer means being disposed between a power spring wind up shaft which is fastened with the inner end of said power spring and an output shaft rotatably supported by the casing, a narrow neck section being formed at an outer end of said power spring, at a power spring fastening section of a power spring pull up window hole formed on the opposed section of said first case and said second case, said neck section of said power spring pulled from said window hole being fastened so that it is hooked both to said first case and said second case, said first case and said second case being connected with a fastening pin and a fastening hole in the vicinity of said power spring pull up window, the free end of one of the cases being in contact with the wall surface of the other case.

The neck section at the outer end of the power spring housed in the power spring housing section is hooked to both the first case and the second case. When the power spring is wound by turning the power spring wind up shaft, the stress applied to the casing by the neck section at the outer end of the power spring is absorbed by the engagement of the fastening pin and the fastening hole and the contact of one case and the other case.

BRIEF DESCRIPTION OF THE DRAWINGS

FIG. 1 is a right side view of a power spring drive apparatus embodying the present invention wherein a second case is dismounted;

FIG. 2 is a sectional view of FIG. 1;

FIG. 9 is a right side view showing the first case;

FIG. 10 is a sectional view of the first case taken along the line 10—10 of FIG. 9;

FIG. 11 is a left side view showing the second case;

FIG. 12 is a sectional view showing the second case taken along the line 12—12 of FIG. 11.

DETAILED DESCRIPTION OF THE PREFERRED EMBODIMENT

Figure 3:
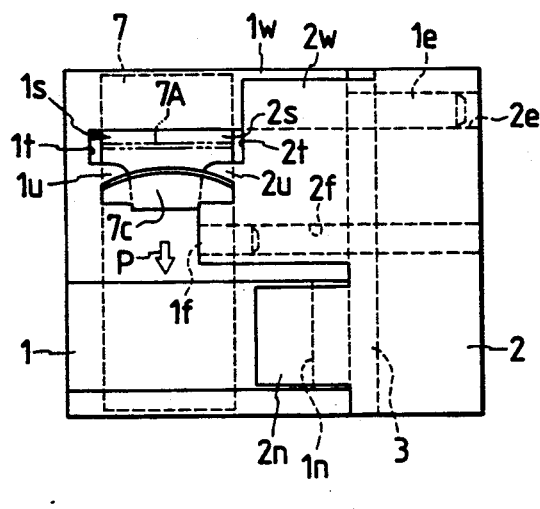
FIG. 3 is a front view of FIG. 1.

In FIGS. 1 through 5, a casing made of synthetic resin consists of a first case 1 and a second case 2. Between these cases, an intermediate plate 3 is disposed as a gear train supporting plate. An output shaft 4 is rotatably supported on the casing, the output shaft 4 protruding from both cases. On the output shaft 4, a gear 5 is securely mounted. In the casing, both ends of a power spring wind up shaft 6 are rotatably supported; the one end and the other end of the power spring wind up shaft 6 being passed through a shaft hole 1a of the first case 1 and a shaft hole 2a of the second case 2, respectively. The power spring wind up shaft 6 is provided with a slit 6a for fastening an inner end 7a of the power spring 7, an arm 6b forming a part of an overload protecting mechanism, and a square hole 6c which is engaged with a drive shaft (not shown) when the power spring is pulled up.

At the shaft section structuring the square hole 6c on the power spring wind up shaft 6, a sun gear 8 comprising a large diameter gear 8a, a small diameter gear 8b, and a concave section 8c engaged with an arm 6b is relatively and rotatably engaged.

Figure 6:
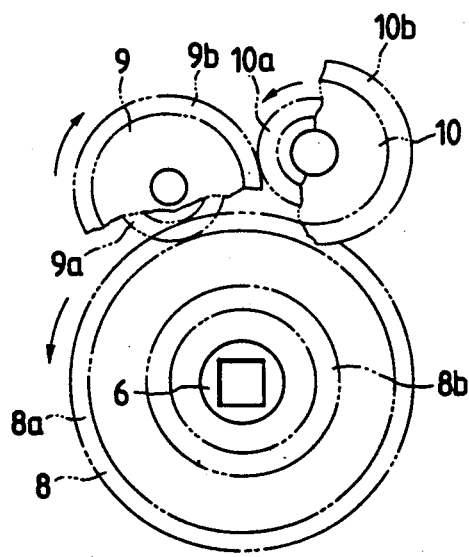
FIG. 6 is a top view showing the operation of the releasing system one-way tension transfer means when the power spring is wound up.
Figure 13:
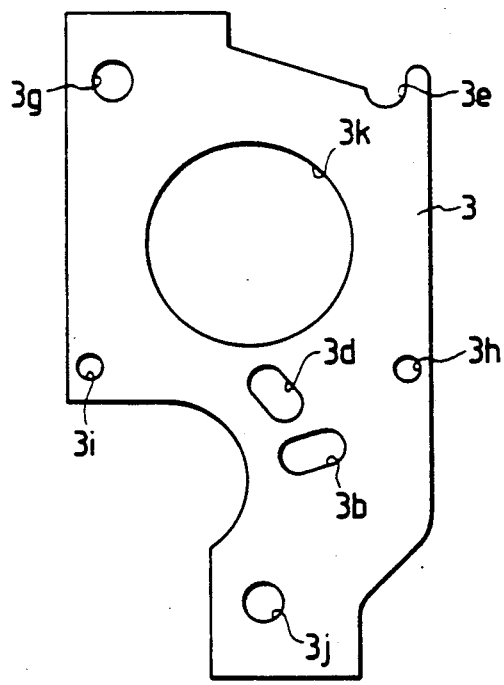
FIG. 13 is a top view showing the intermediate plate.

The large diameter gear 8a of the sun gear 8 is meshed with a small diameter gear 9a of a planet gear 9 (see FIG. 6). The planet gear 9 is supported by an arc shaped support hole 1b (see FIG. 9) formed on the first case 1 and an arc shaped support hole 3b (see FIG. 13) formed on the intermediate plate 3 so that the planet gear 9 epicyclically rotates about the shaft support hole 1a. The large gear section 9b of the planet gear 9 is meshed and dismeshed to and from the small diameter gear 10a of the interstage gear 10 (see FIG. 7). The detail will be described later. The interstage gear 10 is rotatably supported by a shaft support hole 1c (see FIG. 9) which is formed on the first case 1 and a shaft support hole 2c (see FIG. 11) which is formed on the second case 2. A large gear section 10b of the interstage gear 10 is always meshed with the gear 5 of the output shaft.

The large gear section 10b of the interstage gear 10 is always meshed with a planet gear 11 whose sun gear is the interstage gear 10. The planet gear 11 is supported by an arc shaped support hole 2d (see FIG. 11) and an arc shaped support hole 3d (see FIG. 13) formed on the intermediate plate 3 so that the planet gear 11 epicyclically rotates about the shaft support hole 2c of the second case 2. The planet gear 11 is meshed and dismeshed to and from a small diameter gear 8b of the sun gear 8 (see FIG. 1). The detail will be described later.

Figure 7:
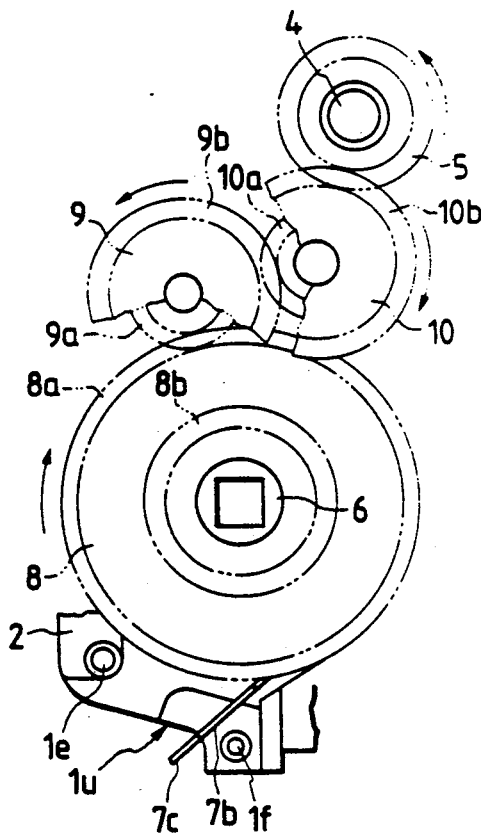
FIG. 7 is a top view showing the operation of the releasing system one-way tension transfer means when the power spring is released.

As shown in FIG. 1, when the output gear 4 is rotated, the interstage gear 10 meshed with the gear 5 rotates the planet gear 11 and thereby a gear section 11a is meshed with the small diameter gear 8b of the sun gear 8. Thus, the power spring wind up shaft 6 is rotated in the power spring wind up direction. A wind up system one-way tension transfer means is structured by a gear train comprising the gear 5, the interstage gear 10, the planet gear 11, and the sun gear 8. On the other hand, as shown in FIG. 7, when the sun gear 8 is rotated in the arrow direction by the releasing force of the power spring, the planet gear 9 is meshed with the interstage gear 10 and thereby the output gear 4 is rotated in the arrow direction. A releasing system one-way tension transfer means is structured by a gear train comprising the sun gear 8, the planet gear 9, the interstage gear 10, and the gear 5.

Next, the connected state of the first case 1, the second case 2, and the intermediate plate 3 will be described. As shown in FIGS. 3, 8, 9, 10, 11, 12 and 13, fastening pins 1e, 1f, 1g, 1h, 1i and 1j formed on the first case 1 are engaged with fastening holes 2e, 2f, 2g, 2h, 2i, and 2j formed on the second case 2, respectively. On the intermediate plate 3, the holes 3g, 3h, 3i, and 3j that the fastening pins 1g, 1h, 1i, and 1j pass, a fastening section 3e engaged with the fastening pin 1e, and a window hole 3k which does not interfere with the small diameter gear 8b of the sun gear 8 are formed. On both ends of the first case 1, fastening stage sections 1m and 1n are formed. On the second case 2, elastically fastening pieces 2m and 2n, which are fastened to the fastening stage sections 1m and 1n, are formed.

Figure 8:
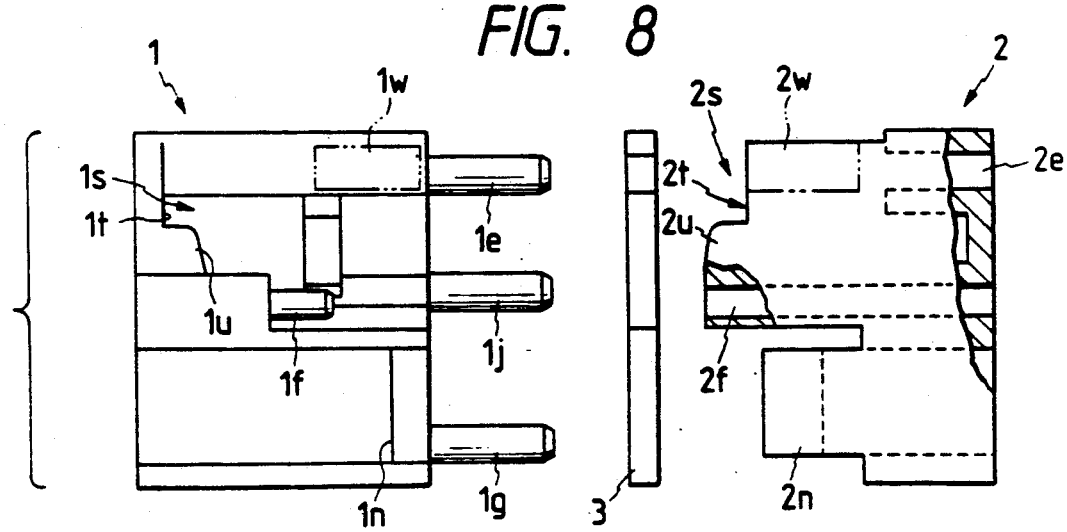
FIG. 8 is a front view showing the first case and the second case being disassembled.

As shown in FIG. 9, the first case 1 is provided with a power spring housing section 1p comprising walls 1p1, 1p2, and 1p3, disposed about the power spring wind up shaft 6. As shown in FIGS. 8 and 9, on the first case 1, a cut section 1s which connects the power spring housing section 1p and the outside of the case is formed. As shown in FIGS. 8 and 11, on the second case 2, a cut section 2s is formed. The distance between bottoms 1t and 2t of the cut sections is slightly larger than the width of the power spring 7A (see FIG. 3) which is wound to the power spring housing section 1p. The cut sections 1s and 2s structure a window hole for housing the power spring being wound. On the window hole, fastening stage section 1u and 2u as power spring fastening sections for narrowing the window hole are formed.

When the first case 1 and the second case 2 are connected, as shown in FIG. 3, a free end 2w (see FIG. 8) of one side wall of the second case 2 is in contact with a wall surface 1w (see FIG. 8) of the first case 1 from the outside thereof.

Figure 5:
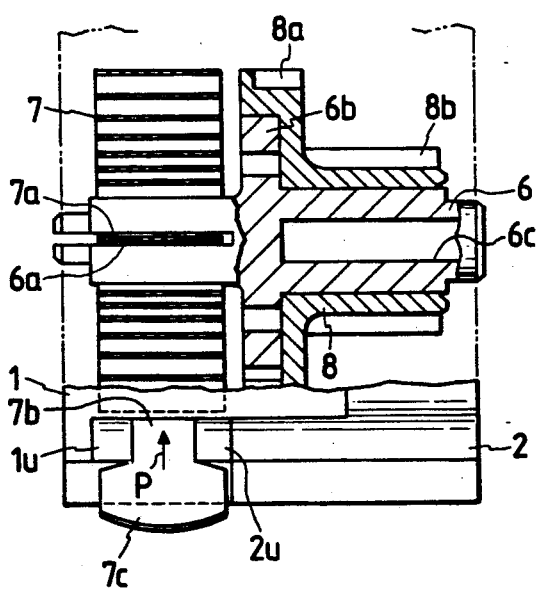
FIG. 5 is a sectional top view showing the fastening state of the outer end of the power spring and the casing.

As shown in FIG. 5, at the outer end of the power spring 7, a neck section 7b is formed, whose width is equal to or slightly smaller than the distance between the fastening stage sections 1u and 2u. At the outer end of the power spring, a lug section 7c is formed which is engaged with the fastening stage sections 1u and 2u.

Figure 4:
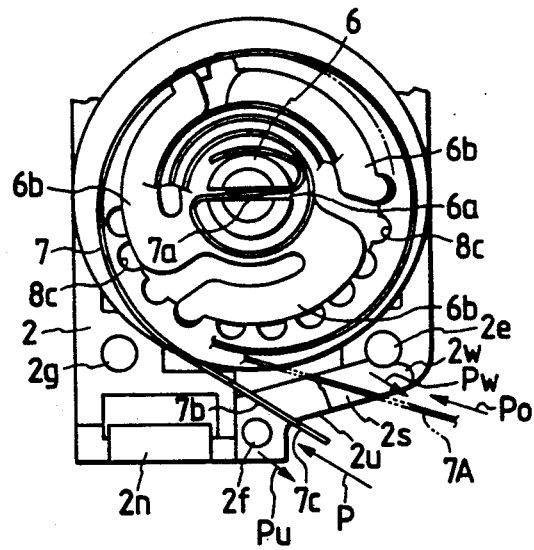
FIG. 4 is a left side view describing a pull up operation of the power spring.

Then, the operation for winding up the power spring 7 will be described in the following. Assume that several parts except for the power spring are mounted in the casing. As shown in FIG. 4, the slit 6a of the power spring wind up shaft 6 is faced to the power spring pull up window holes 1s and 2s. After the inner end 7a of the power spring 7A which is passed from the window hole is fastened to the slit 6a, the power spring wind up shaft 6 is rotated by a drive shaft of a power spring wind up mechanism (not shown) so as to wind up the power spring in the arrow direction PO. When the power spring 7 is wound up, it is frictionally moved along the side surfaces of the fastening stage sections 1u and 2u. When the neck section 7b comes to the stage section, as shown in FIGS. 4 and 5, the lug section 7c is fastened to the fastening stage sections 1u and 2u and thereby the outer end of the power spring 7 is secured.

By housing the power spring 7, the power spring drive apparatus is formed.

In FIG. 1, by rotating the shaft 4 clockwise and by turning the gear 5 in the same direction, the power spring 7 is wound up. The rotation of the gear 5 causes the interstage gear 10 to rotate counterclockwise and the planet gear 11 to epicyclically rotate counterclockwise. The planet gear 11 is meshed with the small diameter gear 8b of the sun gear 8. When the sun gear 8 is rotated, the power spring wind up shaft 6, whose arm 6b is engaged with the concave section 8c is rotated. Thus, the power spring 7 is wound up and the energy is stored. When the sun gear 8 is rotated counterclockwise, the planet gear 9 which is meshed with the concave section 8c is epicyclically rotated in the same direction as shown in FIG. 6. Thus, the planet gear 9 is dismeshed. When the power spring 7 has been wound up, the power spring 7 applies a force in the direction of code P of FIG. 4 to the fastening stage sections 1u and 2u via the lug section 7c of the neck section 7b. This force (P) works in the direction where the casing made of synthetic resin is deformed. However, part of the force is transferred to the fastening stage sections 1u and 2u which are connected by the engagement of the fastening pin 1f and the fastening hole 2f in the direction of code Pu of the figure. In addition, the force applied to the fastening stage section 2u of the second case 2 tends to deform the side wall of the casing. However, since the free end 2w of the side wall is in contact with the wall surface 1w of the first case 1, the free end 2w backs up and absorbs part of the force applied to the fastening stage section 2u. The first case 1 structuring the power spring housing section 1p tends to expand by the expanding force of the power spring being released. This force is absorbed by the second case 2 which are connected with the connecting pins 1e, 1g, 1h, and 1i and the connecting holes 2e, 2g, 2h, and 2i and by the intermediate plate 3 (see FIG. 1) which is fastened to each pin with the fastening section 3e and the fastening holes 3g, 3h, and 3i and thereby the deformation of the casing is prevented.

When the wind up operation is continued by the output gear 4 against the power spring wind up shaft 6 where the power spring 7 has been wound up, namely, when the gear train of the wind up system is overloaded, the arm 6b of the power spring wind up shaft 6 is elastically deformed. Thus, the concave section 8c of the sun gear 8 is disengaged from the arm 6b, the gear train can be freely rotated and the overload can be prevented.

Next, the operation for releasing the power spring will be described. When stopping the wind up operation with the output gear 4, as shown in FIG. 7, the power spring wind up shaft 6 rotates the sun gear 8 with the stored energy of the power spring 7 counterclockwise. The rotation of the sun gear 8 causes the planet gear 9 to epicyclically rotate in the same direction. Thus, the large diameter gear 9b is meshed with the small diameter gear 10a of the interstage gear 10. The gear 5 meshed with the large gear section 10b is rotated in the arrow direction of the figure and thereby the output gear 4 is rotated. When the planet gear 9 transfers its rotation, the planet gear 11 of the wind up system gear train is guided to the support holes 2d and 3d as the interstage gear 10 rotates. Thus, the planet gear 11 is epicyclically rotated and thereby the planet gear 9 is dismeshed form the small diameter gear 8b of the sun gear.

As described above, according to the present invention, since the outer end of the power spring can be fastened to the casing, the production cost of the power spring can be reduced. In addition, by using a special connection of the casing made of synthetic resin, when the power spring is wound up, it is possible to securely prevent the casing from being deformed.

What is claimed is:

1. A power spring drive apparatus comprising:
   (a) a synthetic resin case having a first case and a second case fastened together, said resin case defining:
   (i) a power spring housing section;
   (ii) a power spring pull up window hole formed by opposed sections of said first and second cases when said first and second cases are fastened together, said window hole having a power spring fastening section, wherein said power spring fastening section includes first and second fastening stage sections;
   (b) fastening pin and fastening hole means in the vicinity of said window hole for connecting together said first and second cases such that a free end of one of said cases is in contact with a wall surface of the other of said cases so as to absorb a portion of force applied to said power spring fastening section, wherein said first and second fastening stage sections are connected together by said fastening pin and fastening hole means;
   (c) an output shaft disposed within said resin case and extending outside said resin case;
   (d) a power spring wind up shaft disposed in said resin case;
   (e) a power spring located in said power spring housing section and having one end connected to said power spring wind up shaft;
   (f) a wind up system one-way tension transfer means for transferring a rotating force of said output shaft to said power spring, via said power spring wind up shaft to wind up said power spring; and
   (g) a releasing system one-way tension transfer means for transferring a rotating force of said power spring via said power spring wind up shaft to said output shaft;
   (h) said wind up system one-way tension transfer means and said releasing system one-way tension transfer means being positioned in said resin case between said output shaft and said power spring wind-up shaft; and
   (i) said power spring having a lug section and a neck section pulled through said window hole and fastened to said power spring fastening section, said lug section engaging each of said first and second fastening stage sections.

2. A power spring drive apparatus as claimed in claim 1, wherein said wind up system one way tension transfer means comprises:
   (a) an output shaft gear rotatably fixed to said output shaft;
   (b) an interstage gear meshed with said output shaft gear;
   (c) a planet gear moveable about the center of said interstage gear for a limited distance and meshed with said interstage gear;
   (d) a wind up shaft gear rotatable with said wind up shaft; and
   (e) said planet gear being movable to be in mesh with or out of mesh with said wind up shaft gear.

3. A power spring drive apparatus as claimed in claim 2, wherein said releasing system one way tension transfer means comprises:
   (a) said output shaft gear;
   (b) said interstage gear meshed with said output shaft gear;
   (c) said wind up shaft gear;
   (d) a second planet gear;
   (e) said second planet gear being meshed with said wind up shaft gear, and being moveable between an in mesh condition and an out of mesh condition with said interstage gear.

* * * * *